Jan. 8, 1957 J. MANDELKORN 2,777,092
TRANSISTOR TRIGGERING CIRCUIT
Filed July 20, 1953
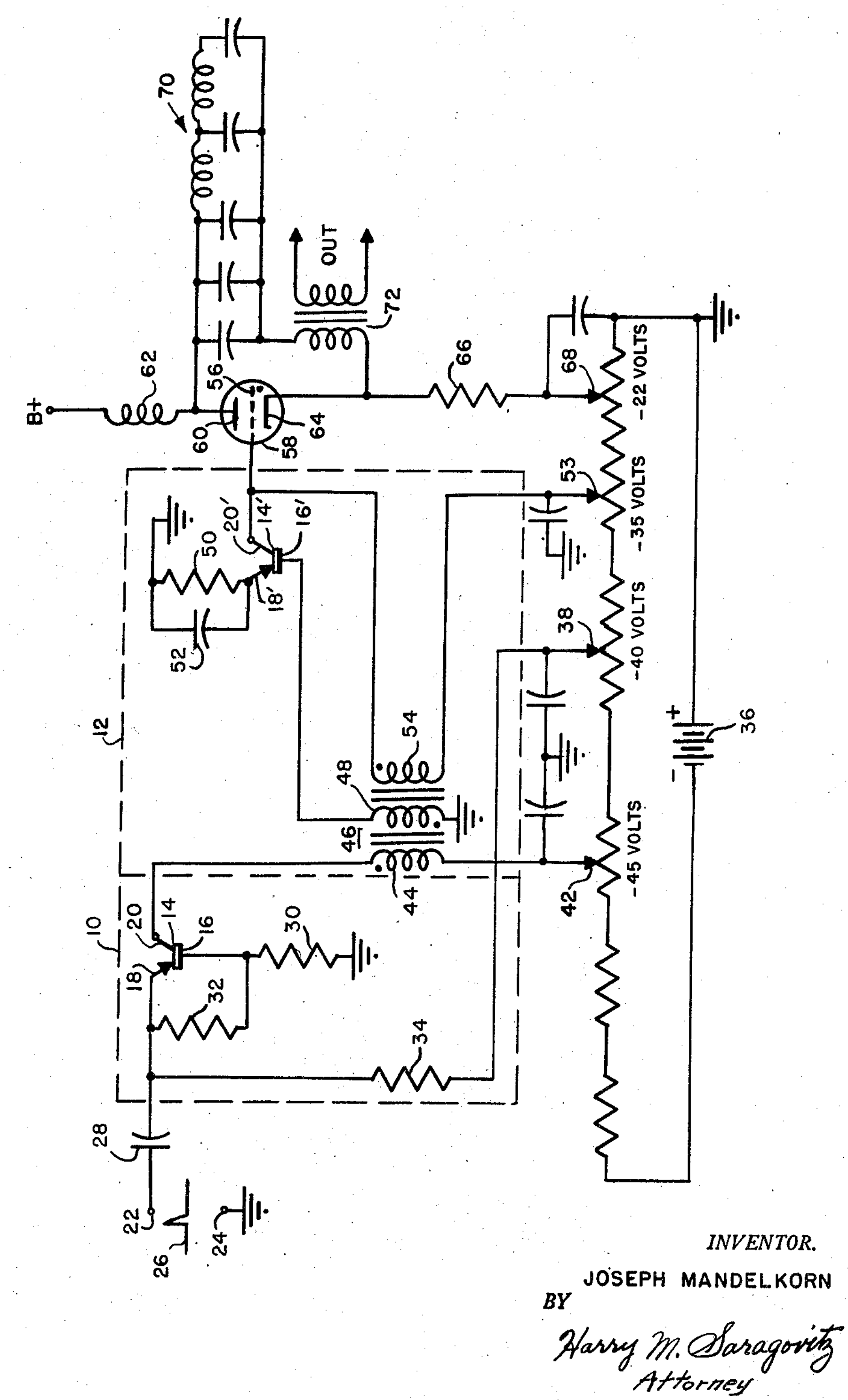
INVENTOR.
JOSEPH MANDELKORN
BY
Harry M. Saragovitz
Attorney United States Patent Office 2,777,092

Patented Jan. 8, 1957

2,777,092

TRANSISTOR TRIGGERING CIRCUIT

Joseph Mandelkorn, Lakewood, N. J., assignor to the United States of America as represented by the Secretary of the Army Application July 20, 1953, Serial No. 369,263

1 Claim. (Cl. 315—252)

(Granted under Title 35, U. S. Code (1952), sec. 266)

The invention described herein may be manufactured and used by or for the Government for governmental purposes, without the payment of any royalty thereon.

This invention relates to transistor trigger circuits and more particularly to a transistor trigger circuit for use with thyratrons.

The thyratron type tube usually requires a low impedance, high power device to drive it and, under normal conditions, the driver must be capable of dissipating the power usually required to trigger the thyratron. Heretofore transistor type triggering circuits were thought to be unfeasible for use with thyratron type tubes because of the power dissipation limitations of the transistor.

It is therefore an object of the present invention to provide an improved transistor triggering circuit which avoids this limitation.

It is another object of the present invention to provide an improved transistor triggering circuit for firing thyratron type tubes with rapid-rise time, low-amplitude pulses.

In accordance with the present invention, the thyratron triggering circuit comprises a first and second transistor each including a semiconductor body, an emitter electrode, a collector electrode and a base electrode, all in contact with said body. Means are included for normally biasing the electrodes and the grid of the thyratron in a relatively non-conducting polarity. Also included are means coupled to the emitter electrode of the first transistor for periodically biasing the emitter electrode thereof in a relatively conducting polarity thereby causing the remaining electrodes of the first transistor to be biased in a relatively conducting polarity, and means in circuit with the collector electrode of the first transistor for generating a pulse when the electrodes thereof are biased in a relatively conducting polarity. Means are also provided for coupling the generated pulse to the second transistor base electrode whereby the emitter and collector electrodes of the second transistor are biased in a relatively conducting polarity. Also included are means in circuit with the collector electrode of the second transistor and also regeneratively coupled to the base electrode of the second transistor for producing a triggering pulse which is applied to the grid of a thyratron. The negative bias voltage applied to the collector electrode of the second transistor is utilized to supply cutoff bias for the thyratron and a suitable bias potential is supplied to the cathode of the thyratron. The difference in bias potential between said cathode and the collector electrode of the second transistor maintains the thyratron in its cutoff position until triggered. The thyratron is provided with a cathode resistor to prevent heavy surges of current in the second transistor collector electrode when the thyratron is fired.

For a better understanding of the present invention, together with further and other objects thereof, reference is had to the following description taken in connection with the accompanying drawings and its scope will be pointed out in the appended claims.

Referring now to the drawing, there is shown schematically a transistor triggering circuit comprising a monostable transistor network 10 and a blocking oscillator transistor network 12 each containing a three-electrode transistor amplifier. The transistor amplifier in network 10 comprises a block 14 of semi-conductor material such as, for example, the high back voltage germanium prepared in the manner described in "The Transistor, a Semi-Conductor Triode," by J. Bardeen and W. H. Brattain, published in the Physical Review, volume 14, page 230, July 15, 1948. Block 14 has a low resistance base electrode 16 in contact with one face thereof, and two point contact electrodes in a closely spaced relationship relative to one another engaging the opposite face. Contact 18, designated by the arrowhead, is the emitter and the nearby contact 20 is collector. Similarly, the transistor amplifier in the blocking oscillator transistor network 12 comprises a block 14′, a resistance base electrode 16′ in contact with one face thereof, and two point contact electrodes 18′ and 20′, 18′ being the emitter and 20′ being the collector.

At 22 and 24 there are provided two input terminals to which are applied conventional triggering pulses indicated at 26. These pulses are applied through capacitor 28 to emitter 18 which is initially biased at a suitable negative potential with respect to ground through voltage dividing resistors 30, 32, and 34 connected between ground and a voltage source such as battery 36 by means of movable tap 38. As shown, battery 36 has its positive terminal grounded and a potentiometer arrangement connected thereacross to provide discrete negative biasing voltages. The value of resistor 34 is so chosen that it is approximately ten times that of resistor 30 and one hundred times that of resistor 32 so that most of the voltage drop from source 36 is across resistor 34. Emitter 18 is connected to the junction of resistors 32 and 34 and base electrode 16 is connected to the junction of resistors 30 and 32 so that, effectively, base electrode 16 is connected to ground through resistor 30. Collector 20 is connected to a suitable negative bias voltage by means of movable tap 42 through primary winding 44 of pulse transformer 46. Tap 38 is adjustable in such a manner that the emitter 18 bias voltage is negative with respect to base electrode 16 so that the electrodes of transistor 14 are normally biased in a relatively non-conducting polarity. Secondary winding 48 of pulse transformer 46 is connected between ground and base electrode 16′. Emitter 18′ is connected to ground through the parallel arrangement of resistor 50 and capacitor 52. Collector electrode 20′ is connected to a suitable negative bias potential by means of movable tap 53 through tertiary winding 54 and is also directly connected to control grid 56 of thyratron tube 58. Plate 60 of thyratron 58 is connected to B+ through choke coil 62 and cathode 64 of said thyratron is connected to a suitable negative bias voltage through cathode resistor 66 by means of potentiometer tap 68. A conventional pulse forming network 70 is connected between plate 60 and cathode 52 in series with the primary of output transformer 72. Taps 53 and 68 are adjusted in such a manner that the difference in negative bias potential between cathode 64 and collector 20′ maintains thyratron 58 at cutoff because of the bias applied directly to grid 56 through tertiary winding 54.

The theory of operation of a three-electrode semiconductor amplifier is believed to be sufficiently well known so that further explanation is not deemed necessary.

Let it be assumed that transistor amplifier 14 is normally non-conductive because of the negative bias applied to emitter 18; that thyratron 58 is cut off by the negative voltage applied directly to grid 56 through tertiary winding 54; and that the blocking oscillator transistor network is maintained at cutoff by the voltage developed across the parallel circuit of resistor 50 and capacitor 52 due to the current leakage between collector 14' and emitter 18'. In the embodiment shown in the drawing, it was empirically determined that the best results were obtained with the bias voltage values indicated at taps 42, 38, 53 and 68 for a 2D21 thyratron and 1698 type transistors which are point contact type transistors. A description of the 1698 type transistor may be found on pages 762–764 of "The Transistor, Selected Reference Material on Characteristics and Application," prepared by Bell Telephone Laboratories, Inc., for Western Electric Company, Inc., and published in 1951. With positive input pulses 26 impressed across input terminals 22 and 24 and coupled to emitter 18 through capacitor 28, transistor amplifier 14 will be rendered conductive. The positive voltage applied to emitter 18 will raise the emitter voltage whereupon the collector current increases and generates a positive pulse in primary winding 44. The width of this pulse, of course, is essentially a function of the width of input trigger 26 and the values of coupling capacitor 28 and resistors 30 and 32. The pulse developed in primary winding 44 is inverted, as indicated by the dots, and is applied as a negative pulse to base 16' of blocking oscillator network 12 through secondary winding 48 as a triggering pulse. This effectively causes emitter current to flow releasing holes to collector 20'. The collector current pulls the collector potential up, and inverted transmission through tertiary winding 54 causes base 16' to fall in potential thus further increasing emitter 18' current. This output pulse of blocking oscillator network 12 has a rise time of a few hundredths of a microsecond.

During the regenerative transition, the emitter current is charging capacitor 52 negatively, but, as this capacitor charges, the emitter current decreases because the emitter 18' becomes less positive with respect to the base 16'. However, at the same time that the emitter current is falling, the rate of change of collector current required in tertiary winding 54 to maintain the base electrode negative with respect to the emitter electrode is increasing. When the emitter current has fallen to a point where it no longer releases the holes necessary to support the demanded collector current, the base voltage will rise towards ground which will cause a further decrease in emitter current, and the transistor blocking oscillator will regeneratively cut itself off. Capacitor 52 returns to its original negative potential because of the leakage through resistor 50, through emitter electrode 18' and base electrode 16' to ground. The output of the transistor blocking oscillator instantaneously drops the voltage at collector 20' to nearly ground potential, thus providing a switch for connecting thyratron grid 56 to ground through a very low impedance. With grid 56 grounded, the potential applied to cathode 64 through tap 58 and resistor 66 drives the thyratron and causes it to fire. This method of firing the thyratron permits the use of the degenerative cathode resistor 66. The use of such a resistor in the cathode circuit prevents heavy surges of current on the collector when the thyratron fires and prevents the collector 20' from exceeding its rated power dissipation and also prevents damage to the transistor characteristics due to such surges. The thyratron 58 operates in the conventional manner once it is triggered and the output is taken from the secondary of output transformer 72.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

In combination, a thyratron having at least a grid, a plate and a cathode, a source of biasing potentials negative with respect to ground, and a resistor in series connection with said cathode and one of said negative biasing potentials, means for triggering said thyratron comprising a pulse source, a point contact transistor having an emitter electrode, a collector electrode and a base electrode, said grid and said collector electrode being connected in common to a bias potential more negative than the bias applied to said cathode through said resistor whereby said thyratron is initially at cutoff, a parallel arrangement including a resistor and capacitor connected between said emitter and ground, said collector electrode being so biased that the current flowing between said collector electrode and said emitter electrode produces a bias on said emitter electrode whereby said emitter and said collector are biased in a relatively nonconducting polarity with respect to said base electrode, means for coupling the output of said pulse source to said base electrode whereby said emitter electrode and said collector electrode are baised in a relatively conducting polarity, and means in circuit with said collector electrode and said grid and regeneratively coupled to said base electrode for producing a triggering pulse at said grid whereby said thyratron is fired only by the applied bias to said cathode through said resistor.

References Cited in the file of this patent

UNITED STATES PATENTS

| | | |
|---|---|---|
| 2,600,270 | Saunders | June 10, 1952 |
| 2,620,448 | Wallace | Dec. 2, 1952 |

OTHER REFERENCES

"Transistor Circuit Design" by Raisbeck, pp. 128–132, 130 of Electronics for Dec. 1951; vol. 24, No. 12.